L. ROUANET.
VERIFYING APPARATUS.
APPLICATION FILED AUG. 4, 1917.

1,319,361.

Patented Oct. 21, 1919.
2 SHEETS—SHEET 1.

INVENTOR:
Louis Rouanet
BY
ATTY.

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

VERIFYING APPARATUS.

1,319,361.  Specification of Letters Patent.  Patented Oct. 21, 1919.

Application filed August 4, 1917. Serial No. 184,494.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Verifying Apparatus, of which the following is a specification.

The object of the present invention is a method for verification of the radius of an annular groove of any desired section, and also of the position of this groove in relation to various planes perpendicular to the axis. The principal idea involved in the invention consists in placing the groove to be verified against a fixed cylinder in whose axis is a small spring-mounted pointer so designed as to be constantly pressed against the bottom of the portion to be verified or at the middle of the arc determined by the two points of contact with the cylinder. The variations of the position occupied by this pointer are observed by means of a suitably disposed amplifying device designed to indicate the various heights of the above mentioned arc. The piece to be verified is placed in the apparatus so that the chord of the arc thus formed shall be always parallel to the axis of said piece, in order to permit the use of a second amplifying device whose pointer rests upon one face of the piece, and it thus indicates the exact distance between this face and the axial plane of the groove.

The invention relates still more particularly to an apparatus which is especially designed for verification of the radius of an annular groove section forming the surface or rolling way for outer ball-bearing rings, and the position of this radius with reference to the faces of such rings. In this apparatus, the principle employed is that the surface of the rolling way is placed at two points on the same meridian against the aforesaid fixed cylinder. It is understood that the ring is placed so that the chord of the arc is always parallel to the axis of said ring, so as to allow of verifying the distances between the faces of the ring and the axial plane of the annular groove.

This invention also consists in employing with the apparatus a set of standards formed of portions of bored and rectified cylinders having different radii which of course correspond to the radii of the different groove surfaces to be verified. When it is desired to verify a series of rings having groove surfaces of the same radius, the apparatus need only be adjusted by the use of the corresponding standard.

The present device will be better understood by referring to the accompanying drawings.

Figure 1:
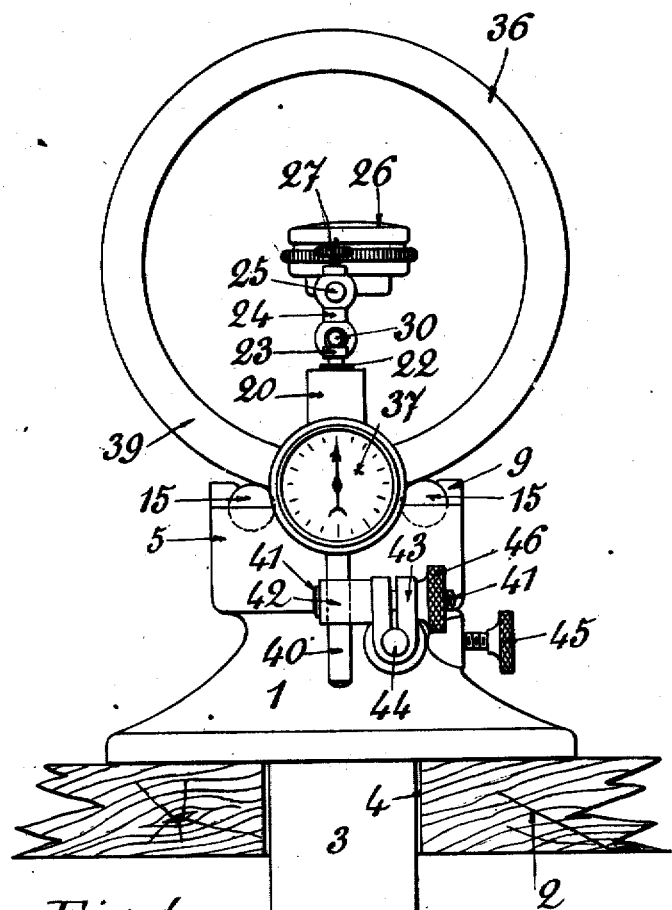
Figure 1 represents a front view of the apparatus.

The present apparatus is designed for verification of all sizes of rings, and it comprises a base 1 which can be fixed in any suitable manner upon a table 2, the base being extended below by a cylindrical portion 3 which passes freely through an opening 4 in the table. The top of the base forms a rectangular block 5 which carries a transversal groove 6. At the center of the base is bored a hole 7 in which a hollow cylindrical rod 8 can take a vertical displacement. This rod ends at the top in a rectangular head 9 which is designed to slide in the groove 6 of the base 1. The head 9 is invariably displaced toward the top; into the threaded hole 10 is screwed the end of a threaded rod 11 carrying at its upper part a screw thread corresponding to the threaded part 10 of the head; the rod is provided at the other end with a milled head 12. This rod 11 is used to adjust the height of the head 9. A spring 13 is disposed between the bottom 14 of the base and the head 9 in which latter are inserted two cylinders 15 by driving fit. In another threaded hole 16 on the base 1 is screwed the cylindrical rod 17 belonging to a piece 18 which latter carries a groove 32 cut on the milling machine. Through this groove passes a small shaft 19 which holds the pointer-carrier 20, the latter being mounted on a pivot; the pointer-carrier can be set at any desired height by means of the milled set screw 33.

A small spring plunger 21 is disposed within the boss 28 of the piece 18, and this plunger serves to lock the pointer carrier in a fixed position. In this pointer-carrier are mounted on the one hand the fixed cylinder 22 on which slides the verifying pointer 23, and on the other hand a rod 24 carrying at its upper end a hole in which slides the rod 25 carrying the amplifying device 26; this latter can be set in any desired position by means of the screw 27. The variations of the pointer 23 are transmitted to the pointer 29 of the amplifying device 26 through a pivoted beam 30 mounted within the rod 24 upon two small screws 31 which serve to form a pivot together with the two opposite pointed portions of the beam. A spring 34 is mounted with one end on the beam 30 and the other on the pointer-carrier 20, and it serves to keep the pointer 30 constantly pressed against the groove surface 35 of the ring 36.

A second amplifying device is mounted so that its pointer 38 comes in contact with the front face 39 of the ring, and it indicates the variations in distance between said front face and the axial plane of the groove surface. This amplifying device is disposed so that it can be separated according to the thickness of the different rings to be verified, and to this end the cylindrical head 40 upon which it is mounted can slide within a hole in the pin 41, and this latter pin also slides within a small sleeve 42. This sleeve is also traversed by the rod 40. The pin 41 traverses the two lugs of a shaft collar 43 which is disposed to slide upon the cylindrical rod 44, this rod being held in a hole in the base 1 by means of the milled screw 45. The use of the single nut 46 threaded upon the end of the pin 41 allows of fixing at the same time the collar 43 on the rod 44, and the rod 40 in the hole of the sleeve 42, and this operation adjusts the amplifying device in the vertical sense as well as adjusting it as a greater or less distance from the front face of the ring under verification.

Figure 4:
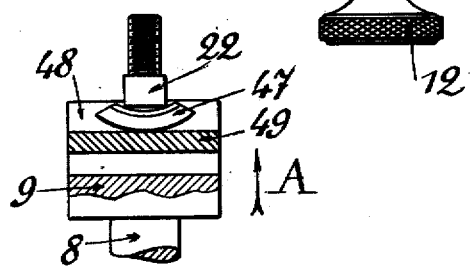
Figs. 3 and 4 are two sections showing the method of mounting the standard for adjustment of the apparatus.
Figure 2:
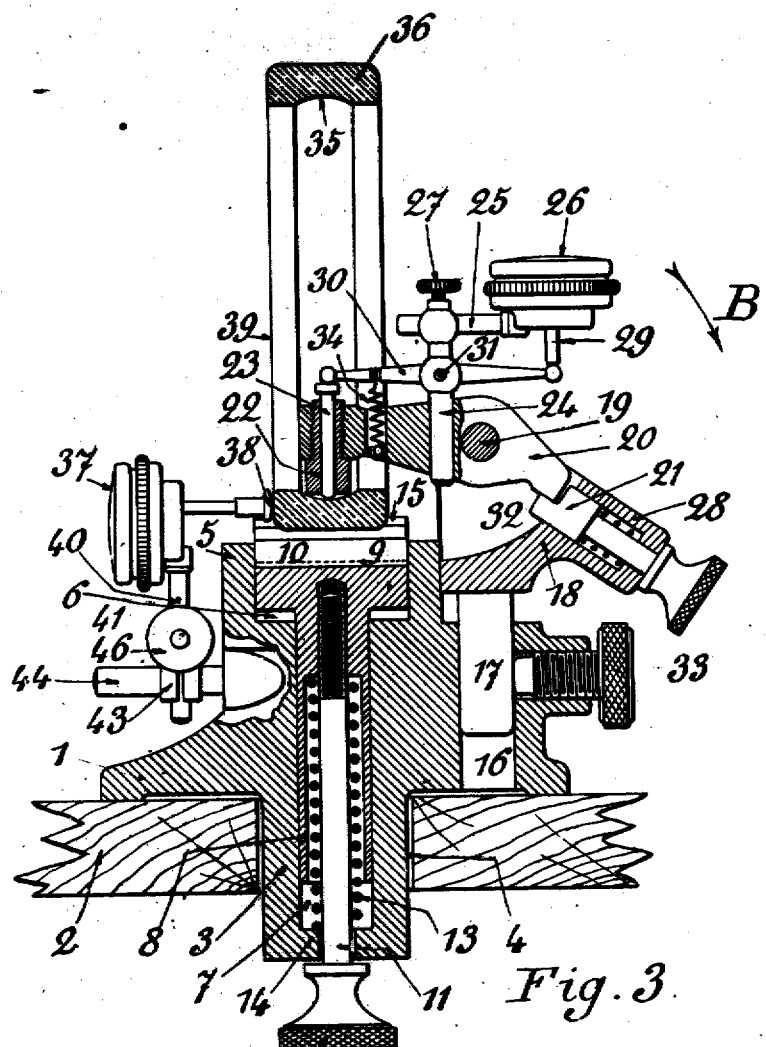
Fig. 2 is a vertical section.
Figure 3:
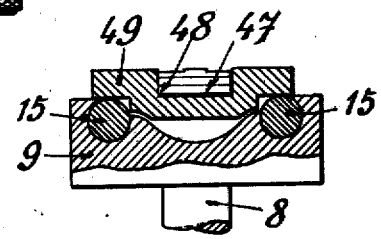

The method of verifying a series of rings by the use of this apparatus is as follows: In the first place, the apparatus is calibrated with a standard which corresponds to the radius of the annular groove under verification. To this effect the standard 47 is placed without side play in the groove 48 of the rectified block 49, and this block is disposed so as to bear upon the two cylinders 15 of the head 9, which latter is pressed in the sense of the arrow A by the spring 13 against the fixed cylinder 22 (Figs. 3 and 4). The movement of the head 9 is limited by operating the milled head 12. The pointer-carrier is locked in its operative position by the plunger 21. When this plunger is drawn back against its spring, this movement allows of placing the pointer-carrier in the inoperative position by turning it upon its shaft 19 in the sense of the arrow B (Fig. 2). The standard 47 is pressed by the spring 13 against the fixed cylinder 22, and the verifying pointer 23 is held against the surface of the annular groove by the spring 34. The amplifying device 26 is turned so as to bring the zero of the graduated scale opposite the needle, and when this is done, the ring 36 to be verified is substituted for the block 49. The variations of radius are now indicated in the amplifying device 26 by the differences in the heights of the arc formed by the groove surface 35, the fixed cylinder 22 and the pointer 23. The second amplifying device 37 is mounted so that its pointer 38 comes in contact with the face 39 of the ring 36, and the zero mark of the scale is also brought opposite its needle, whereupon the amplifying device shows the differences which may exist between the actual distance from said face to the axial plane of the groove surface and the normal value of said distance. It is understood that the device is not limited to rings for ball-bearings, but can be employed for any other piece carrying a groove of any kind, and this can be verified by the use of a suitably designed apparatus constructed and operated upon the above principles.

Having now described my invention, what I claim as new and desire to secure by Letters Patent is:

1. An apparatus for verifying the radius and the position of the groove in a ball bearing ring, comprising a cylinder, means for applying one end of said cylinder against the surface of the groove, means for holding the ball bearing ring with its axis parallel to said end of the cylinder, a pointer movable along the axis of the cylinder, means for causing the pointer to bear against the surface of the groove, means for measuring the displacement of said pointer with respect to the cylinder from a predetermined position, a pointer adapted to bear against a side face of the ring and means for measuring the displacement of said pointer with respect to a predetermined position.

2. An apparatus for verifying the radius and the position of the groove in a ball bearing ring, comprising a cylinder, a laterally swinging supporting member for said cylinder, means for holding said supporting member in operative position, whereby the cylinder is adapted to bear by one of its ends against the surface of the groove, a pointer movable along the axis of the cylinder, means carried by the supporting member for causing the said pointer to bear against the surface of the groove, means on said supporting member for measuring the displacement of said pointer with respect to the cylinder from a predetermined position, spring actuated means for holding the ball bearing ring with its axis parallel to the said end of the cylinder, a pointer adapted to bear against a side face of the ring and means for measuring the displacement of said pointer with respect to a predetermined position.

3. An apparatus for verifying the radius and position of a groove, containing, in combination, a base, adjustable means provided upon said base for holding the piece to be verified, a swinging pointer-carrier, adjustable means provided upon said base for holding said pointer-carrier, a cylinder mounted at one end of said pointer-carrier and against which is pressed the groove of piece to be verified, a pointer working within said cylinder and making contact with the groove to be verified, an amplifying device, a contact piece carried by said amplifying device, a pivoted beam having one end in contact with the above-mentioned pointer and the other end in contact with said contact piece, means provided upon said pointer-carrier for holding said amplifying device and said beam, a withdrawing spring connecting the beam with the pointer-carrier, means for maintaining the pointer-carrier in the operative position, a second amplifying device, a contact piece carried by said amplifying device and adapted for making contact with one of the side faces of the piece to be verified, and adjustable means provided upon the base for holding said second amplifying device, substantially as described and for the purpose set forth.

4. An apparatus for verifying the radius and position of a groove containing, in combination, a base having a lateral hole, adjustable means provided upon said base for holding the piece to be verified, a swinging pointer-carrier, adjustable means provided upon said base for holding said pointer-carrier, a cylinder mounted at one end of said pointer-carrier and against which is pressed the groove of piece to be verified, a pointer working within said cylinder and making contact with the groove to be verified, an amplifying device, a contact piece carried by said amplifying device, a pivoted beam having one end in contact with the above-mentioned pointer and the other end in contact with said contact piece, a rod mounted on the pointer-carrier which rod is traversed by said beam and has a hole in its upper part, a pair of pivot screws disposed within said rod and supporting said beam, an arm forming part of said amplifying device and disposed to slide in the hole of said rod, means for retaining the arm of the amplifying device in the fixed position, a withdrawing spring connecting the beam with the pointer-carrier, means for maintaining the pointer-carrier in the operative position, a second amplifying device, a contact device carried by said amplifying device and adapted for making contact with one of the side faces of the piece to be verified, a rod fixed in the lateral hole in the base, a screw for retaining said rod in fixed position, a split collar sliding upon said rod, a pin traversing said split collar, a sleeve surrounding said pin, an arm fixed to the second amplifying device above mentioned and traversing said sleeve and said pin, and a nut screwed upon said pin which clamps said rod and said collar in fixed position, substantially as described and for the purpose set forth.

5. An apparatus for verifying the radius and position of a groove, containing, in combination, a base having a lateral hole and provided also with a bored hole terminating at the top by a transversal groove, a hollow rod movable in said hole and carrying at the top a head movable in said groove, a spring disposed between the bottom of said base and said movable head, a threaded rod traversing the base and screwing into said head, two cylinders inserted by driving fit into said head and holding the piece to be verified, a piece provided with a rod movable within another bored hole in the base, a screw for retaining said piece in a fixed position, a pivot shaft provided in said piece, a pointer carrier mounted to pivot around said shaft, a cylinder mounted at one end of said pointer carrier and against which is pressed the groove of the piece to be verified, a pointer working within said cylinder and making contact with the groove to be verified, an amplifying device, a contact piece carried by said amplifying device, a pivoted beam having one end in contact with the above-mentioned pointer and the other end in contact with said contact piece, a rod mounted on the pointer-carrier which rod is traversed by said beam and has a hole in the upper part, a pair of pivot screws disposed within said rod and supporting said beam, an arm forming part of said amplifying device and disposed to slide in the hole of said rod, a screw carried by said rod and disposed for retaining the arm of the amplifying device in a fixed position, a withdrawing spring connecting the beam with the pointer-carrier, a plunger carried by the piece which holds the shaft of the pointer-carrier, which plunger maintains said pointer-carrier in an operative position, a spring acting on said plunger, a second amplifying device, a contact piece carried by said amplifying device and adapted for making contact with one of the side faces of the piece to be verified, a rod fixed in the lateral hole in the base, a screw for retaining said rod in a fixed position, a split collar sliding upon said rod, a pin traversing said split collar, a sleeve surrounding said pin, an arm fixed to the second amplifying device above mentioned and traversing said sleeve and said pin, and a nut screwed upon said pin for clamping said rod and said collar in a fixed position, substantially as described and for the purpose set forth.

6. An apparatus for verifying the radius and position of a groove, containing in combination: a base, adjustable means provided upon said base for holding the piece to be verified, a rectified block adaptable upon the said means and having a groove, a standard piece placed without side play in the said groove, a swinging pointer-carrier, adjustable means provided upon the above mentioned base for holding said pointer carrier, a cylinder mounted at one end of said pointer carrier and against which is pressed the groove of the standard piece, a pointer working within said cylinder and making contact with the said groove, an amplifying device, a contact piece carried by said amplifying device, a pivoted beam having one end in contact with the above-mentioned pointer and the other end in contact with said contact piece, means provided upon said pointer carrier for holding said amplifying device and said beam, a withdrawing spring connecting the beam with the pointer-carrier, means for maintaining the pointer-carrier in the operative position, a second amplifying device, a contact piece carried by said amplifying device and adapted for making contact with one of the side faces of the block and adjustable means provided upon the base for holding said second amplifying device, substantially as described and for the purpose set forth.

In testimony whereof I have signed my name to this specification in the presence of two subscribing witnesses.

LOUIS ROUANET.

Witnesses:
 Louis Moses,
 Chas. P. Pressly.